June 2, 1931. P. DE MATTIA 1,808,295
COLLAPSIBLE TIRE BUILDING FORM
Filed March 13, 1930 3 Sheets-Sheet 1

INVENTOR
Peter De Mattia
BY
ATTORNEYS

June 2, 1931.  P. DE MATTIA  1,808,295
COLLAPSIBLE TIRE BUILDING FORM
Filed March 13, 1930   3 Sheets-Sheet 2
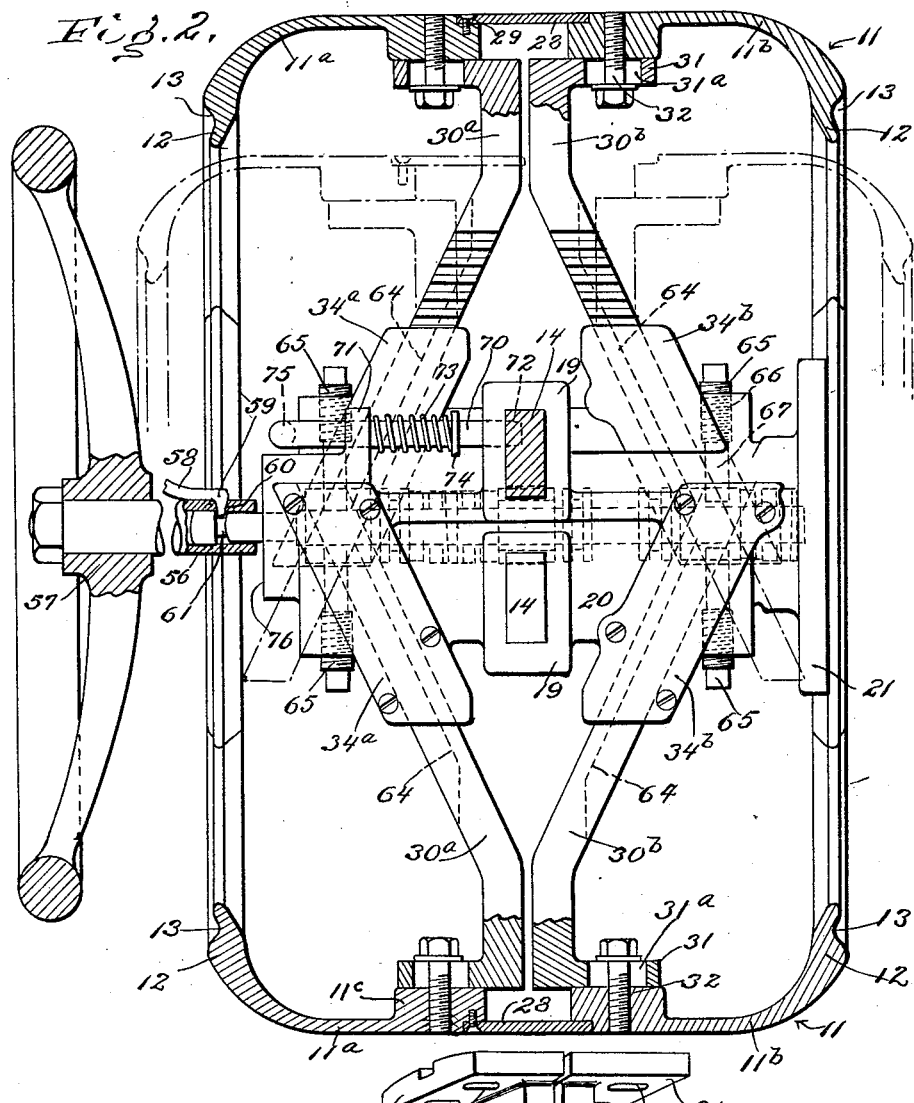
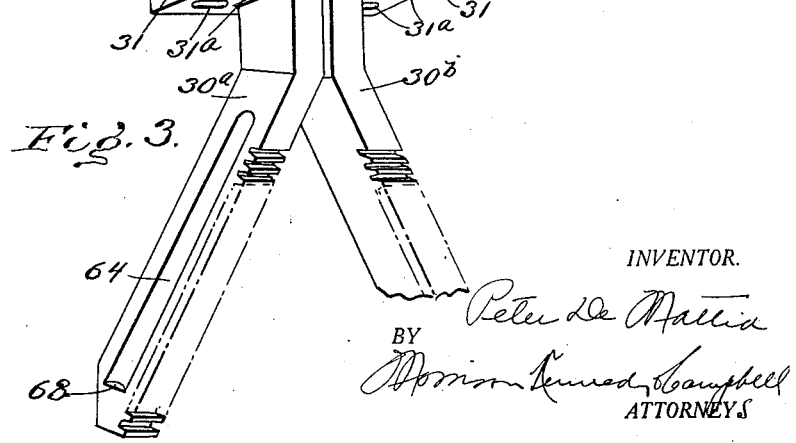
INVENTOR.
Peter De Mattia
BY
ATTORNEYS June 2, 1931.  P. DE MATTIA  1,808,295
COLLAPSIBLE TIRE BUILDING FORM
Filed March 13, 1930  3 Sheets-Sheet 3
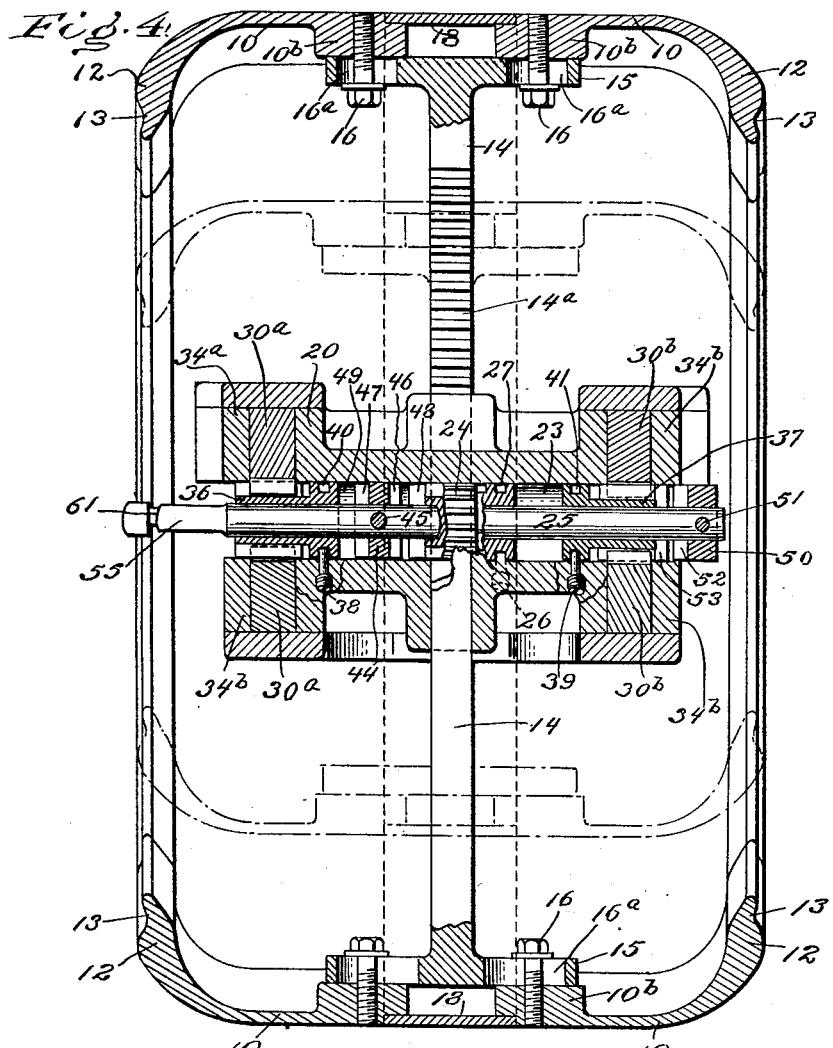
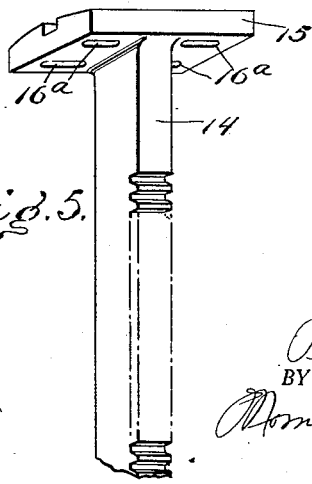
INVENTOR.
Peter De Mattia
BY
ATTORNEYS Patented June 2, 1931

1,808,295

UNITED STATES PATENT OFFICE

PETER DE MATTIA, OF PASSAIC, NEW JERSEY, ASSIGNOR TO NATIONAL RUBBER MACHINERY COMPANY, A CORPORATION OF OHIO

COLLAPSIBLE TIRE BUILDING FORM

Application filed March 13, 1930. Serial No. 435,387.

The present invention relates to collapsible cores and chucks, such as are used in the manufacture of automobile tire casings, and refers more particularly to cores of the drum type whereon the tire casings can be built in pulley band form.

An important feature of the invention is the provision of a core of the above mentioned character which will be of extremely simple yet rugged construction, and which may be easily collapsed to a sufficient extent to facilitate removal of the tire casings without distortion, and this even though the casings be of the smallest size now in use.

More specifically, the invention contemplates a tire building drum formed of a plurality of segmental sections adapted for collapsing and expanding movement. The key sections are diametrically opposed to each other and are movable toward and from each other in the plane of operative continuity. The other or secondary sections are parted circumferentially and are movable obliquely into and out of the plane of operative continuity, and when collapsed, their parted portions occupy positions out of their normal operative plane. The operations of collapsing and expanding the core are effected through the medium of section supporting racks and pinions mounted in a main rotatable support or driving member and manually operable through selective clutch mechanism.

The foregoing and other features, objects and advantages of the invention will be fully understood from the following description in connection with the accompanying drawings, wherein one form of the invention is shown by way of illustration, and wherein—

Fig. 2 is a vertical transverse sectional view on line 2—2 of Fig. 1;

Fig. 3 is a detail perspective view of the supporting racks for the secondary sections;

Fig. 4 is a horizontal transverse sectional view substantially on line 4—4 of Fig. 1; and Fig. 5 is a detail perspective view of the supporting rack for one of the key sections.

Figure 1:
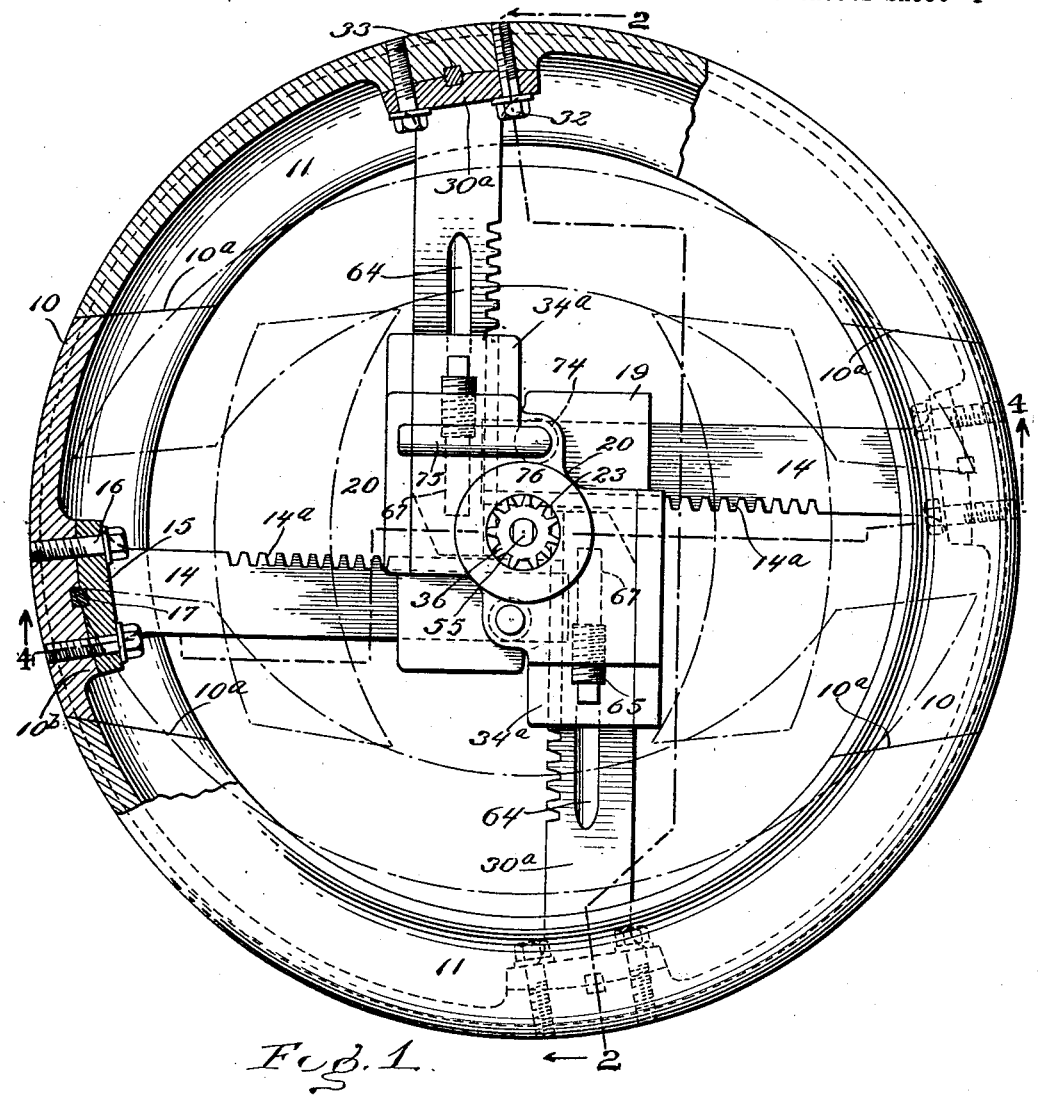
Fig. 1 is an end view, partly in section, of the improved chuck.

The improved core illustrated in the drawings is of the drum type now used in building tires in pulley-band form, altho it may be of any other type to which the invention would be applicable. The core comprises essentially a pair of primary or key sections 10, diametrically opposed to each other, and a pair of secondary or intermediate sections 11 which, together with the key sections 10, form a complete annular drum. At their opposite side edges, these sections, which are segmental, are formed with inwardly curved flanges 12 having bead seating grooves 13 (Figs. 2 and 4). The depth and profile of these side flanges will vary according to the style or type of tire to be made, the present improvements being intended to permit the use of a high crown or a low crown drum or of a flat drum. The key sections 10 are of less arcuate extent than the secondary sections 11, and have their ends $10^a$ appropriately beveled, as shown in Fig. 1, to mate accurately with those of the secondary sections. When the device is in use for building a tire, the segmental core sections are related to each other as shown by the full lines in Figs. 1, 2 and 4, but in order to remove the built-up tire, the core must be collapsed, and for this purpose the sections are adjustably supported by a chuck mechanism which will now be described.

Each of the key sections 10 is secured to a rack bar, 14, having at its outer end an enlarged head member 15 to which the core section is fastened by screws 16. These screws 16 pass through appropriate transverse slots $16^a$ in the head member 15 and take their anchorage in screw-threaded holes in thickened pad portions $10^b$ formed on the inner sides of the key sections 10. In order to relieve the screws 16 of shearing stresses when the device is in use, the meeting faces of the head members 15 and pad portions $10^b$ are provided with keyways or grooves (Fig. 1) for the reception of keys 17.

It is to be noticed (see Fig. 4) that the key sections 10 of the core are each made up of two circumferentially parted members having their inner opposing edges spaced with reference to each other and connected together by a relatively thin arcuate bridge plate 18, the outer face of which is flush with the outer faces of the circumferentially parted members. Furthermore, the head member 15 is so formed as to bridge the space between the opposing edges of these members at the inner sides thereof, and the slots 16ª make possible an adjustment to vary the width of the drum for different sizes of tires. Two or more interchangeable bridge plates 18 are employed to give whatever width is desired.

The rack bars 14 are rectangular in cross-section and have their inner ends slidably disposed in correspondingly formed guides 19 arranged parallel with each other at opposite sides of a main supporting and driving member 20. The body of this driving member 20 is substantially cylindrical in form and is provided at one end (Fig. 2) with a flange 21 or other suitable means for connection in the usual manner with the main support or driving unit (not shown) of a tire building machine. A central bore 23 is formed longitudinally through the member 20, and the arrangement of the guides 19 is such that the rack bars are movable tangentially with reference to said bore, and with their toothed edges 14ª extending slightly into the same at opposite sides thereof.

Disposed within the bore 23, and meshing with the toothed edges 14ª of the rack bars, there is a pinion 24 which is loosely or rotatably mounted upon a shaft 25 extending through the bore. This pinion and the guides 19 are arranged substantially midway of the ends of the member 20, and by rotating the pinion in one direction or the other, the rack bars 14 will be shifted longitudinally, and the key sections 10 thus moved radially inward or outward either to collapse or to expand the core. While the pinion is free to rotate, it is held against axial movement by a screw 26 which engages in an annular groove 27 formed in an end extension of the pinion. The means for rotating the pinion will be described later.

The secondary or intermediate sections 11 are also parted circumferentially, each being composed of two members 11ª and 11ᵇ with their inner opposing edges spaced apart and the space bridged by an arcuate plate 28 similar to the plate 18. These members 11ª and 11ᵇ are, unlike those of the key sections, movable with reference to each other during the collapse of the core, and for this reason the plates 28 are secured by screws 29 to the members 11ª only, being free from connection with the members 11ᵇ. In order that these circumferentially parted members 11ª and 11ᵇ may be actuated, they are respectively connected to rack bars 30ª and 30ᵇ, each of which has a head member 31 with two slots 31ª for adjustable securement by screws 32 to the corresponding core members. Keys 33 (Fig. 1) are also used between the head members 31 and the thickened pad portions 11ᶜ to relieve the screws 32 of shearing stresses.

Instead of being straight, like the rack bars 14, the rack bars 30ª and 30ᵇ are angularly offset as shown in Figs. 2 and 3, their toothed portions extending obliquely in opposite directions and at opposite sides of the central circumferential plane of the core. These oblique portions of the rack bars are slidable in guides 34ª and 34ᵇ adjacent the opposite ends of the driving member 20, and have their toothed edges entering the bore 23 tangentially at opposite sides, the pair 30ª meshing with a pinion 36, and the pair 30ᵇ meshing with a pinion 37. These pinions 36 and 37 are also rotatably mounted on the central shaft 25 and are held against axial movement thereon by the engagement of screws 38 and 39 in grooves 40 and 41, as clearly shown in Fig. 4. According to this arrangement, by rotating the pinions 36 and 37 in either direction, the rack bars 30ª and 30ᵇ will be moved inwardly or outwardly to impart radial movement to the sections 11ª and 11ᵇ which, by virtue of the inclination of the rack bars, will also be moved axially at the same time. The component of the radial and axial movements is, of course, an oblique line, so that when collapsed, the secondary sections will occupy positions as indicated by the dot-and-dash lines in Fig. 2. The chuck will interchangeably accommodate drums for various diameters; also the drums may be varied in width by substitution of different bridge plates or gap shields.

The core sections are not all moved simultaneously, but in a definite sequence, by the manipulation of suitable clutches now to be described. As shown in Fig. 4, there is disposed between the pinions 24 and 36 a slidable clutch member 44 keyed to the shaft 25 by a transverse pin 45. This clutch member is provided at its opposite ends with jaws or teeth 46 and 47 adapted alternately to engage correspondingly formed jaws or teeth 48 and 49 on the opposing ends of the pinions 24 and 36. The shaft 25 and the parts secured to it are slidable axially with reference to the pinions to make and break the connections between the several clutch members. At its rearward end, the shaft also has another clutch member 50, secured by a pin 51, and having jaws or teeth 52 for engagement with jaws 53 in the adjacent end of the pinion 37.

The arrangement of the parts is such that the clutches may occupy a neutral position as shown in Fig. 4, or they may be engaged to actuate either the pinion 24 alone or the pinions 36 and 37 together. By pushing the shaft 25 rearwardly or to the right in Fig. 4, the jaws 46 will engage the jaws 48, whereupon the pinion 24 can be rotated alone. On the other hand, by moving the shaft in the opposite direction, the jaws 47 and 52 of the clutches 44 and 50 will respectively engage the jaws 49 and 53 of the two pinions 36 and 37, so that these pinions can be rotated together in the same direction independently of the pinion 24.

The forward end of the shaft 25 is reduced and squared as at 55, so that it can receive upon it a sleeve 56 carrying a hand wheel 57 (Fig. 2). Associated with the sleeve 56 is a spring detent 58 having its free end 59 offset in such a manner as to extend through an opening 60 in one side of the sleeve 56, and engage within a groove 61 formed in the shaft adjacent to the end of the squared portion 55. Thus, the spring detent 58 serves to lock the hand wheel 57 upon the end of the shaft 25, and by virtue of this arrangement the shaft can be rotated and also moved axially to actuate the core segments in the manner above described. These movements may be effected or controlled manually by the operator either while the machine is rotating or after it has been brought to rest. If the drum is to be collapsed while it is still rotating, the operator need only grasp the hand wheel 57 and hold it against rotation but in proper axial position, and the resulting relative movement between the body member 20 and the pinions 24, 36, and 37 will act through the racks to draw the core sections inwardly. If, however, the drum is stopped from rotating, it may be collapsed by merely turning the hand wheel in the proper direction. Thus the operation of the device may be varied to suit individual requirements, yet the construction is such as to permit the use of mechanical bead setters without interference. After being used, the hand wheel may be removed if desired so as not to interfere in any way with the tire building operations, although more preferably it will be left in place for higher speed production.

It is desirable to limit the outward movements of the segmental core sections so as to obtain their accurate circumferential registration, and the offset portions of the rack bars 30ª and 30ᵇ are therefore provided in their outer sides with grooves 64, as best shown in Figs. 2 and 3. Screws 65 are mounted in appropriate threaded sockets 66 in the sides of the oblique guides 34ª and 34ᵇ, said screws having reduced extensions 67 at their inner ends which extend into said grooves 64 and cooperate with the inner end walls 68 of said grooves to stop the outward movements of the rack bars. The screws 65, being adjustable, can be set to compensate for slight manufacturing variations in the lengths of the rack bars and of their grooves 64, as well as to permit the use of other sections for different size drums.

It may be desirable at times to lock the parts in their expanded relation, so that the chuck as a whole may be rotated without any possibility of accidental collapsing before the tire building operations have been completed and so that it can be collapsed only when at a standstill. Accordingly, there is employed a latch mechanism, as best shown in Fig. 2, comprising a rod 70 slidably supported in a boss 71 and in a side wall of one of the guides 19, and disposed in substantially parallel relation to the shaft 25, but outside of the body of the main driving member 20. The inner end of said rod 70 is slightly tapered, as indicated at 72, and is adapted to seat in a correspondingly formed hole or socket of the adjacent rack bar 14 when the chuck is expanded, so as to lock said rack bar against sliding movement within its guide 19. The rod 70 is maintained in its locking position by a compression spring 73 disposed between the boss 71 and a fixed collar 74 on the rod 70. The outer or forward end 75 of the rod 70 is offset or turned at right angles to provide a handle member, by means of which the rod 70 may be easily withdrawn from its locking position. When thus withdrawn, the rod 70 may be rotated slightly to engage the inner edge of the handle member 75 against the forward end 76 of the driving member 20, and thereby temporarily to maintain it in its unlocking position while the chuck is being collapsed. The locking of one of the rack bars 14 results of course in the locking of all the parts; yet they may be very easily and quickly unlocked and collapsed to permit the removal of the built-up tire.

As previously stated, the parts when in use occupy the relative positions illustrated by the full lines in Figs. 1, 2 and 4, in which condition the chuck and drum may be rotated as a unit for the tire building operation. After the tire has been completed, it is only necessary for the operator to apply the hand wheel 57 to the forward squared end 55 of the shaft 25 after the drum has stopped rotating, and then to withdraw the latch rod 70 from its locking position. The shaft 25 can then be pushed inwardly or to the right, as viewed in Fig. 4, to mesh the jaws or teeth 46 of the clutch member 44 with the jaws 48 of the pinion 24. Then, by the rotation of the hand wheel in a counterclockwise direction, the pinion 24 will be turned to draw the rack bars 14 inwardly and with them the key sections 10. After these key sections have reached the positions indicated by the dot-and-dash lines in Fig. 1, the shaft 25 will be moved axially to the left, so as to mesh the jaws or teeth 47 and 52 of the clutch member 44 and 50 with the jaws 49 and 53 of the pinions 36 and 37 respectively, whereupon further rotation of the shaft 25 in a counterclockwise direction will cause the rack bars 30ª and 30ᵇ to be moved inwardly by said pinions. Since these rack bars 30ª and 30ᵇ are guided obliquely with reference to the plane of the core, their associated core sections 11ª and 11ᵇ will be moved obliquely to the positions indicated by the dot-and-dash lines in Figs. 1 and 2. In this fully collapsed condition of the drum, the tire which has been built thereon, can be easily removed without distortion. Thereafter, the drum can be expanded back into tire building condition by a reversal of the manual operations described.

The foregoing description of the collapsing operation is conditional upon the initial locking of the parts by the latch rod 70. If, however, the parts are not locked in this way and the hand wheel is left in place during the tire building operation, and in ordinary practice this is the preferred method, the drum may be collapsed while it is still rotating by grasping the hand wheel and holding it against turning, and of course, by shifting it axially as necessary to engage and disengage the clutch members in their proper sequence. In such use, the minimum amount of time is required to remove the finished tire and to prepare for the next operation.

It is pointed out that, by parting the secondary core sections circumferentially and by moving the parted sections obliquely inward, the flanges 12 of the secondary sections will be moved outwardly a considerable distance beyond those of the key sections, and as a result, all of the sections can be moved radially inward a greater distance than would otherwise be possible, and with the advantage that the drum and chuck remain in balance at all times. Also, it is to be noted that the movements referred to can be effected with a minimum amount of manual effort, and so quickly as to reduce considerably the labor cost in manufacturing tires of this kind, and the compactness of the mechanism, combined with rugged construction, insures long wear.

It is, of course, to be understood that the invention is susceptible of numerous modifications in the details of construction and in the arrangement of the parts, and the right is herein reserved to make such changes as fall within the scope of the appended claims without departing from the spirit of the invention.

Having thus described my invention, what I claim is:

1. A collapsible core structure comprising a plurality of segmental core sections, some of which are parted circumferentially, and means for moving the circumferentially parted sections radially inward and axially outward to facilitate the collapse of the core.

2. A collapsible core structure comprising a plurality of segmental core sections, some of which are parted circumferentially, and means for moving the circumferentially parted sections obliquely in opposite directions with reference to the core plane to collapse and expand the core.

3. A collapsible core structure comprising a pair of diametrically opposed primary or key sections, a pair of circumferentially parted secondary sections, means for moving the key sections radially inward in the plane of operative continuity of the core, and means for moving the circumferentially parted portions of the secondary sections obliquely in opposite directions with reference to said plane.

4. In a collapsible core, a segmental section comprising two circumferentially parted members, and means for moving said members obliquely in opposite directions with reference to the plane of operative continuity of the core.

5. In a collapsible core, a segmental section comprising two circumferentially parted members, and means for simultaneously moving said members radially and axially in opposite directions to collapse and expand the core.

6. A collapsible core structure comprising a plurality of segmental core sections arranged in diametrically opposed pairs, one pair of said sections being parted circumferentially, and means for moving the circumferentially parted portions of said pair obliquely in opposite directions with reference to the core plane to collapse and expand the core.

7. A collapsible core structure comprising a plurality of segmental core sections arranged in diametrically opposed pairs, one pair of said sections being parted circumferentially, and means including racks and pinions for moving the circumferentially parted portions of said pair obliquely in opposite directions with reference to the core plane to collapse and expand the core.

8. A collapsible core structure comprising a rotatable support, segmental core sections surrounding said support, two of said core sections being circumferentially parted, pinions within the support, inclined rack bars meshing with said pinions and carrying the core sections at their outer ends, and means for effecting relative rotation between the support and the pinions, whereby to move the circumferentially parted portions of the core obliquely in opposite directions with reference to the core plane.

9. A collapsible core structure comprising a rotatable support, a pair of segmental key sections diametrically opposed to each other, means for moving said key sections radially toward and from the support in the plane of operative continuity of the core, a pair of secondary sections diametrically opposed to each other, said secondary sections being parted circumferentially, means for moving the parted portions of said secondary sections obliquely in opposite directions with reference to the plane of operative continuity, and detachable means for locking the parts in expanded relation.

10. A collapsible core structure comprising a rotatable supporting hub having a central longitudinal bore, a pair of diametrically opposed segmental key sections, a pair of secondary sections intermediate the key sections, said secondary sections being parted circumferentially, a pinion within the bore of the supporting hub and intermediate the ends thereof, a pair of rack bars slidably guided in the supporting hub and meshing respectively with the opposite sides of the pinion, said rack bars being secured at their outer ends to the key sections, two other pinions within the bore of the supporting hub and spaced from the opposite ends of the first pinion, inclined rack bars slidably guided in the hub and meshing with the second pinions, said inclined rack bars being secured at their outer ends to the circumferentially parted portions of the secondary core sections, and means for selectively rotating the pinions in a definite sequence to collapse and expand the core.

11. A collapsible tire-building core of the drum type comprising a plurality of segmental core sections with inwardly extending side edge flanges, some of said sections being parted circumferentially, and means for moving the separate members of said parted portions axially in opposite directions to facilitate collapse of the core without interference between the flanges of adjacent segmental sections.

12. A collapsible tire-building core of the drum type comprising a pair of opposed primary or key sections, a pair of circumferentially parted secondary sections, said sections having inwardly extending side edge flanges with bead-seating grooves therein, means for moving the key sections radially inward in the plane of operative continuity of the core, and means for moving the circumferentially parted portions of the secondary sections obliquely in opposite directions with reference to said plane, whereby to enable said secondary sections to straddle portions of said key sections and thus to avoid interference between their flanges when the core is collapsed.

13. A collapsible core structure comprising a plurality of segmental core sections arranged in diametrically opposed pairs, one pair of said sections being parted circumferentially, means including racks and pinions for moving the circumferentially parted portions of the said pair obliquely in opposite directions with reference to the core plane to collapse and expand the core, and adjustable stops for limiting the expanding movement of the racks.

14. A collapsible core structure comprising a rotatable support, segmental core sections surrounding said support, two of said core sections being circumferentially parted, pinions within the support, inclined rack bars meshing with said pinions and carrying the core sections at their outer ends, said rack bars being guided for movement in the support, and the rack bars of diametrically opposed sections engaging the opposite sides of the same pinions, adjustable stops mounted in the support for limiting the movements of the rack bars, and means for effecting relative rotation between the support and the pinions, whereby to move the circumferentially parted portions of the core obliquely in opposite directions with reference to the core plane.

15. A collapsible core structure comprising a rotatable support, segmental core sections surrounding said support, two of said core sections being circumferentially parted, pinions within the support, inclined rack bars meshing with said pinions and carrying the core sections at their outer ends, said rack bars being guided for movement in the support, and the rack bars of diametrically opposed sections engaging the opposite sides of the same pinions, adjustable stops mounted in the support for limiting the movements of the rack bars, and means including a detachable hand wheel for effecting relative rotation between the support and the pinions, whereby to move the circumferentially parted portions of the core obliquely in opposite directions with reference to the core plane.

16. A collapsible core structure comprising a rotatable support having a central longitudinal bore, segmental core sections surrounding said support, two of said cross sections being circumferentially parted, inclined rack bars secured to the inner sides of the core sections and extending inwardly through guides in the support and substantially tangent to the bore therein, a shaft of smaller diameter disposed within the bore, pinions on the shaft and meshing with the rack bars, said pinions being held against axial movement and being rotatable with reference to the shaft, clutch means for making and breaking driving connection between the shaft and the pinions, and a detachable hand wheel associated with one end of the shaft for controlling said clutch means and for effecting relative rotation between the support and the pinions, whereby to collapse and expand the core.

In testimony whereof, this specification has been duly signed by:

PETER DE MATTIA.